United States Patent
Choi et al.

(10) Patent No.: US 8,152,196 B2
(45) Date of Patent: Apr. 10, 2012

(54) AIRBAG APPARATUS WITH MULTI-PLY AIRBAG CUSHION

(75) Inventors: Hyeong Ho Choi, Gwangmyeong-si (KR); Yong Sun Kim, Namyangju-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 243 days.

(21) Appl. No.: 12/619,564

(22) Filed: Nov. 16, 2009

(65) Prior Publication Data
US 2011/0018237 A1    Jan. 27, 2011

(30) Foreign Application Priority Data

Jul. 27, 2009  (KR) .................. 10-2009-0068177

(51) Int. Cl.
*B60R 21/36* (2011.01)
*B60R 21/231* (2011.01)
*B60R 19/20* (2006.01)

(52) U.S. Cl. ............... 280/728.2; 280/743.2; 180/274

(58) Field of Classification Search ........ 280/728.1, 280/728.2, 729, 743.1, 743.2; 180/271, 274; 493/210
See application file for complete search history.

(56) References Cited

U.S. PATENT DOCUMENTS

| 3,638,755 | A  | * | 2/1972 | Sack .............................. 181/296 |
| 3,814,458 | A  | * | 6/1974 | Acs ............................... 280/729 |
| 4,657,516 | A  | * | 4/1987 | Tassy ............................ 441/125 |
| 5,503,429 | A  | * | 4/1996 | Wallner et al. ............. 280/743.1 |
| 6,220,629 | B1 | * | 4/2001 | Wipasuramonton et al. ................. 280/743.1 |
| 7,036,844 | B2 | * | 5/2006 | Hammer et al. ........... 280/730.1 |
| 2003/0030262 | A1 | * | 2/2003 | Keshavaraj ................ 280/743.1 |
| 2004/0070180 | A1 | * | 4/2004 | Johansson .................. 280/728.1 |
| 2006/0205302 | A1 | * | 9/2006 | Woydick ......................... 442/76 |

FOREIGN PATENT DOCUMENTS

JP   2008168874 A  *  7/2008
KR      97-35261 U       7/1997

* cited by examiner

*Primary Examiner* — Paul N Dickson
*Assistant Examiner* — Keith Frisby
(74) *Attorney, Agent, or Firm* — Morgan, Lewis & Bockius LLP

(57) ABSTRACT

An airbag apparatus may include a fastening unit mounted to a portion of a vehicle, a multi-ply airbag cushion fastened to the fastening unit, the multi-ply airbag cushion being formed by overlapping airbag cushion sheets on each other to form a multi-ply structure, and an inflator to provide gas to the airbag cushion sheets of the multi-ply airbag cushion.

10 Claims, 5 Drawing Sheets

AIRBAG APPARATUS WITH MULTI-PLY AIRBAG CUSHION

CROSS-REFERENCE TO RELATED APPLICATIONS

The present application claims priority to Korean Patent Application Number 10-2009-0068177 filed on Jul. 27, 2009, the entire contents of which application is incorporated herein for all purpose by this reference.

BACKGROUND OF THE INVENTION

1. Field of the Invention

The present invention relates generally to airbag apparatuses and, more particularly, to an airbag apparatus with a multi-ply airbag cushion which can withstand the force of high pressure gas supplied from an inflator.

2. Description of Related Art

As is well known to those skilled in the art, in an airbag apparatus, when a vehicle collision occurs, gas is instantaneously injected into an airbag cushion depending on a signal generated in response to the impact force. Then, the airbag cushion rapidly inflates with the injected gas to surround a driver or a passenger, thus protecting the driver or the passenger from a windshield of the vehicle or an object coming from the front.

Recently, external airbags which are provided between a vehicle body and a bumper to protect a pedestrian have been proposed. Typically, such an external airbag is constructed such that when a vehicle collision occurs, an airbag that is deployed surrounds the entire bumper. Furthermore, an inflator of a large capacity is installed in the external airbag to enable the airbag cushion to surround the entire area of the bumper.

Here, if a coupling structure used in a typical internal airbag apparatus is applied to the external airbag having the inflator of a large capacity, it may not withstand the high pressure of the gas supplied from the inflator. Moreover, while gas is supplied from the inflator of a large capacity to the airbag cushion, some gas may leak out of the airbag cushion.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an airbag apparatus with a multi-ply airbag cushion which can satisfy the strength and the flexibility requirements of the airbag cushion.

In an aspect of the present invention, the airbag apparatus may include a fastening unit mounted to a portion of a vehicle, a multi-ply airbag cushion fastened to the fastening unit, the multi-ply airbag cushion being formed by overlapping airbag cushion sheets on each other to form a multi-ply structure, and an inflator to provide gas to the airbag cushion sheets of the multi-ply airbag cushion, wherein the portion of the vehicle is a bumper or a housing connected to the bumper, the housing retaining the fastening unit and the multi-ply airbag cushion therein.

The multi-ply airbag cushion may have an overlapped portion formed by overlapping a margin of a first side thereof with a margin of a second side thereof, wherein the overlapped portion has a first gas hole formed at a predetermined position through the margin of the first side of the multi-ply airbag cushion, and a second gas hole formed through the margin of the second side of the multi-ply airbag cushion at a predetermined position, and wherein the inflator supplies the gas to the multi-ply airbag cushion through the first and second gas holes.

The fastening unit may include a first fastener mounted to the portion of the vehicle, the first fastener having a first through hole to receive a portion of a guide unit therein, wherein the guide unit is connected to the inflator to receive the gas therethrough, and a second fastener fastened to the first fastener, the second fastener having a second through hole to receive the other portion of the guide unit therethrough, wherein the overlapped portion is disposed between the first and second fasteners.

A plurality of first coupling holes may be formed through a perimeter of the first fastener, and locking members may be inserted into the corresponding first coupling holes to fasten the first fastener to the portion of the vehicle, and a plurality of second coupling holes may be formed through a perimeter of the second fastener, and locking members are inserted into the corresponding second coupling holes to fasten the second fastener to the first fastener.

A first protrusion may protrude from one surface of the first fastener, the first protrusion extending a predetermined length in a longitudinal direction of the first fastener, and second protrusions protrude from the second fastener in a direction opposing a direction in which the first protrusion protrudes, the second protrusions being spaced apart from each other by predetermined intervals.

In another aspect of the present invention, a tether may be coupled to an inner surface of the multi-ply airbag cushion by sewing to control a shape of the multi-ply airbag cushion, wherein the tether is coupled to an inner surface of a front portion of the multi-ply airbag cushion and an inner surface of a rear portion of the multi-ply airbag cushion.

The multi-ply airbag cushion may have a sewn portion formed by sewing the airbag cushion sheets that are overlapped with each other.

The portion of the vehicle may include a bumper mounted to the vehicle, and the multi-ply airbag cushion includes an external airbag cushion provided in the bumper.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
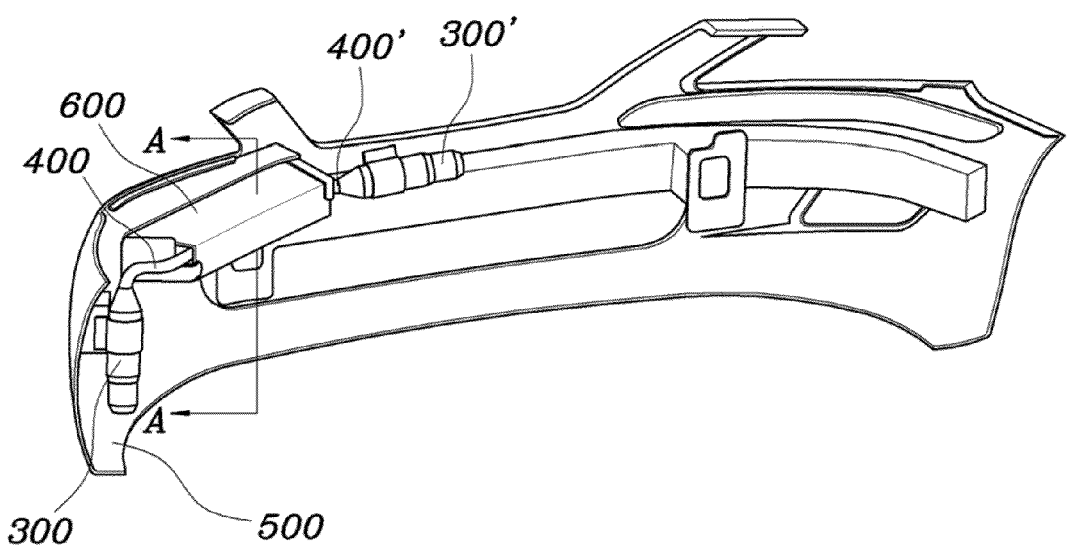
FIG. 1 is a view illustrating a bumper of a vehicle which has an airbag apparatus having a multi-ply airbag cushion mounted thereon, according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the attached drawings.

Figure 2:
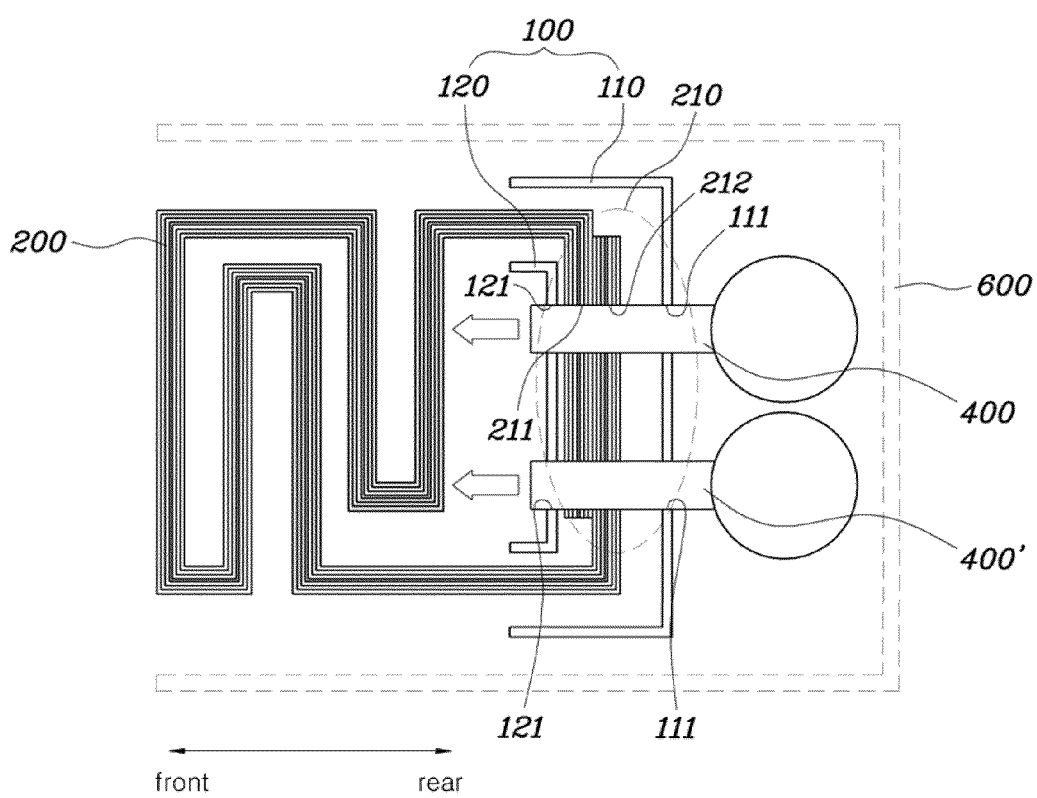
FIG. 2 is a sectional view taken along the line "A-A" of FIG. 1.

As shown in FIGS. 1 and 2, the present invention, in an exemplary embodiment, relates to an external airbag which is installed in a vehicle bumper 500 and provides a technique that can prevent an airbag cushion from being damaged by high-pressure gas supplied thereto.

To achieve this purpose, an airbag apparatus according to an exemplary embodiment of the present invention includes an inflator 300 which supplies high-pressure gas to a multi-ply airbag cushion 200. The inflator 300 is installed at a predetermined position in a vehicle bumper 500 and functions to inject gas into the multi-ply airbag cushion 200. Gas can be transmitted from the inflator 300 to the multi-ply airbag cushion 200 through a guide unit 400 which connects them to each other.

In the exemplary embodiment, two inflators 300 and 300' are connected to the multi-ply airbag cushion 200 through guide units 400 and 400'. However, the present invention may be constructed such that a single inflator 300 is connected to the multi-ply airbag cushion 200 through a single guide unit 400.

The multi-ply airbag cushion 200 is constructed by overlapping a plurality of airbag cushion sheets with each other. Preferably, the multi-ply airbag cushion 200 may be constructed by overlapping three through five airbag cushion sheets. The reason for this is that because the airbag requires gas of high pressure to absorb the energy of a vehicle collision, the airbag cushion must be strong enough to withstand the high pressure while at the same time being flexible and foldable such that it is easily contained in a cushion housing. In other words, in the case where the airbag cushion is constructed by overlapping several airbag cushion sheets on each other, it can be of sufficient strength while having superior flexibility. Of course, the number of airbag cushion sheets which overlap each other can be appropriately varied depending on the intensity of gas pressure supplied from the inflator 300.

Figure 3:
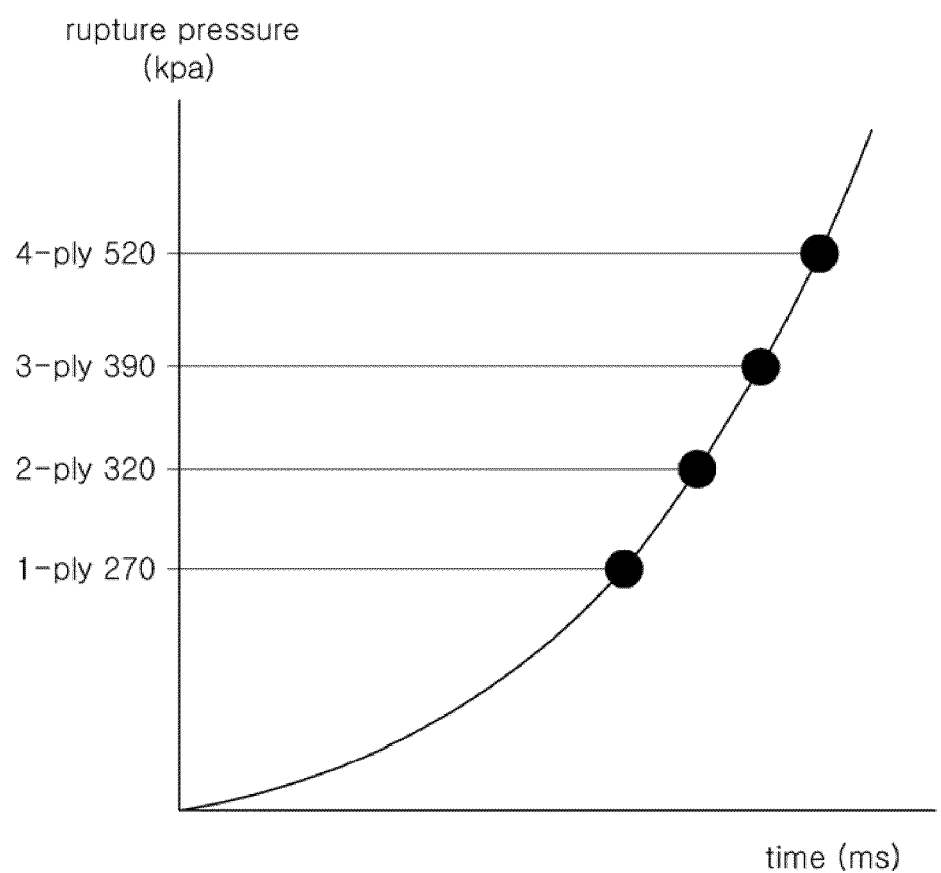
FIG. 3 is a graph showing the rupture pressure of the multi-ply airbag cushion in the airbag apparatus according to an exemplary embodiment of the present invention.

FIG. 3 shows the rupture pressure of the airbag cushion depending on the number of airbag cushion sheets. As shown in FIG. 3, in the case of a single airbag cushion sheet, the rupture pressure thereof is 270 KPa. In the case of a 2-ply airbag cushion, a 3-ply airbag cushion and a 4-ply airbag cushion, the rupture pressures thereof were respectively measured as 320 KPa, 390 KPa and 520 KPa.

Typically, in the external airbag apparatus, gas of high pressure is supplied from the inflator 300 to the airbag cushion. Here, a multi-ply airbag cushion having high rupture pressure is required to prevent the airbag cushion from being damaged by high gas pressure. Therefore, as described in the present invention, in the case where the multi-ply airbag cushion including several airbag cushion sheets is used as the external airbag, even though high gas pressure is applied to the airbag cushion, it can be prevented from being damaged.

Meanwhile, an overlapped portion 210 is formed at a predetermined position on the multi-ply airbag cushion 200. The overlapped portion 210 is formed by overlapping a first margin of multi-ply airbag cushion 200 with a second margin thereof. Furthermore, in the overlapped portion 210, first gas holes 211 are formed through the first margin of the multi-ply airbag cushion 200, and second gas holes 212 are formed through the second margin of the multi-ply airbag cushion 200. Thus, gas is supplied from the inflators 300 and 300' into the multi-ply airbag cushion 200 through the first and second gas holes 211 and 212. Here, the first gas holes 211 and the second gas holes 212 are disposed at positions corresponding to each other. In this structure, the guide units 400 and 400' are disposed through the first and second gas holes 211 and 212, such that gas of the inflators 300 and 300' can be injected into the multi-ply airbag cushion 200 through the guide units 400 and 400'.

Figure 4:
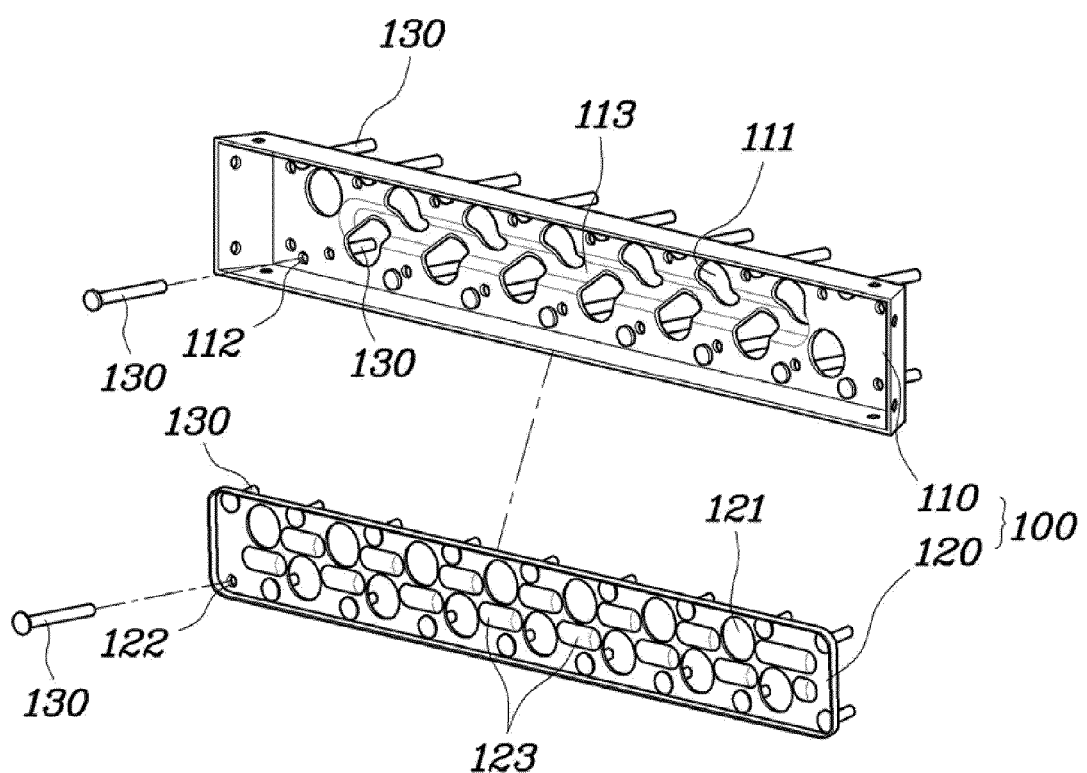
FIG. 4 is an exploded perspective view of a fastening unit of the airbag apparatus according to an exemplary embodiment of the present invention.

As shown in FIG. 4, the fastening unit 100 includes a first fastener 110 which is mounted to the vehicle bumper 500, and a second fastener 120 which is coupled to the first fastener 110 to hold the overlapped portion 210 of the multi-ply airbag cushion 200 between the second fastener 120 and the first fastener 110. Here, the first fastener 110 may be directly fastened to the vehicle bumper 500, in detail, to a bumper frame (not shown). Alternatively, the first fastener 110 may be fastened to the bumper frame by a separate housing 600.

Furthermore, first through holes 111 to connect one portions of the guide units 400 and 400' thereto are formed through the first fastener 110. A plurality of first coupling holes 112 is formed through the perimeter of the first fastener 110. Locking members 130 are inserted into the first coupling holes 112 to fasten the first fastener 110 to the vehicle bumper 500 or the housing 600. In addition, second through holes 121 to connect end portions of the guide units 400 and 400' are formed through the second fastener 120. Second coupling holes 122 are formed through the perimeter of the second fastener 120, so that the locking members 130 are inserted into the second coupling holes 122 to fasten the second fastener 120 to the first fastener 110.

In detail, the first coupling holes 112 are arranged along two rows that extend in the longitudinal direction of the first fastener 110 and are parallel to each other. The second coupling holes 122 are arranged along two rows that extend in the longitudinal direction of the second fastener 120 and are parallel to each other. The first fastener 110 and the second fastener 120 are fastened to each other using the locking members 130 in the state in which the overlapped portion 210 of the multi-ply airbag cushion 200 is interposed therebetween. Hereby, the first fastener 110 can be firmly fastened to the second fastener 120, so that when gas is supplied from the inflators 300 and 300' into the multi-ply airbag cushion 200, gas can be prevented from leaking through the junction between the first fastener 110 and the second fastener 120.

Furthermore, a first protrusion 113 is formed in the first fastener 110, and second protrusions 123 are formed in the second fastener 120. The first protrusion 113 protrudes from one surface of the first fastener 110 and extends a predetermined length in the longitudinal direction of the first fastener 110. The second protrusions 123 protrude from the second fastener 120 in a direction opposing the direction in which the first protrusion 113 protrudes. The second protrusions 123 are spaced apart from each other by regular intervals. Hereby, the first fastener 110 and the second fastener 120 can enhance the strength against a load with respect to the longitudinal direction thereof.

Figure 5:
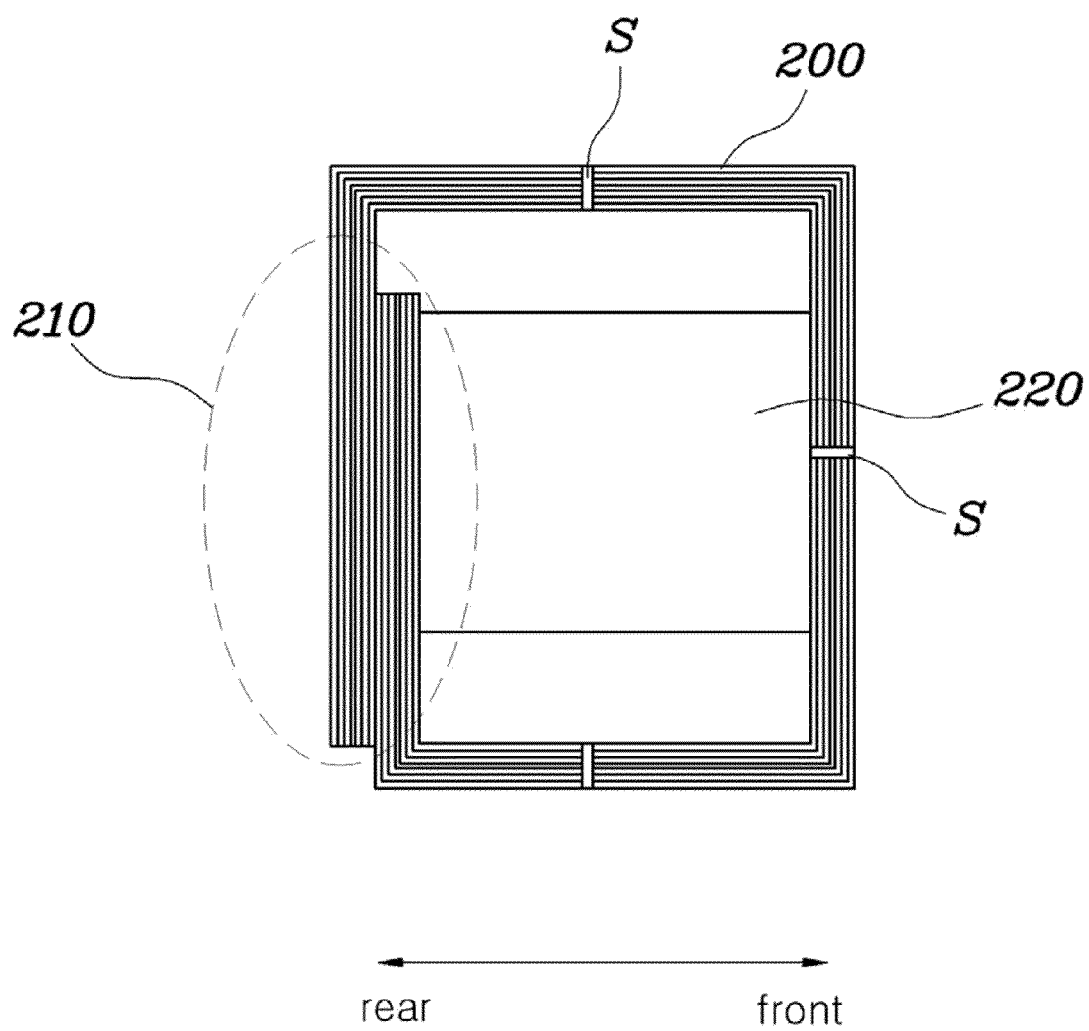
FIG. 5 is a view illustrating the construction of the airbag apparatus having a tether according to an exemplary embodiment of the present invention.

As shown in FIG. 5, a tether 220 may be provided on the multi-ply airbag cushion 200 to control the shape of the airbag cushion of the external airbag. The tether 220 is coupled at both ends thereof to the inner surface of the multi-ply airbag cushion 200 by sewing. Thus, the tether 220 functions to hold the multi-ply airbag cushion 200 such that when the multi-ply airbag cushion 200 is deployed, the airbag cushion forms the desired shape. For example, it may be constructed such that the first margin of the tether 220 is sewn to the inner surface of the front portion of the multi-ply airbag cushion 200 and the second margin thereof is sewn to the inner surface of the rear portion of the multi-ply airbag cushion 200.

Furthermore, a sewn portion S may be formed on the multi-ply airbag cushion 200. The sewn portion S is formed by sewing several airbag cushion sheets. Preferably, several sewn portions S are formed on the front portion and the side portions of the multi-ply airbag cushion 200. The sewn portions S prevent the airbag cushion sheets which have been in the overlapped state from slipping with respect to each other due to impact generated when the vehicle collides with an obstacle. Thereby, the multi-ply airbag cushion having the several airbag cushion sheets can be operated in the same manner as that of a single airbag cushion having an integrated body.

The process of assembling the airbag apparatus of the present invention having the above-mentioned construction will now be explained.

First, the multi-ply airbag cushion 200 is prepared. The multi-ply airbag cushion 200 is constructed by sewing the several airbag cushion sheets, that is, by forming the sewn portions S thereon.

Thereafter, the multi-ply airbag cushion 200 is made such that the first margin and the second margin thereof overlap with each other. The second fastener 120 is disposed inside the multi-ply airbag cushion 200, and the first fastener 110 is disposed outside the multi-ply airbag cushion 200 at a position corresponding to the second fastener 120. Here, the first gas holes 211 and the second gas holes 212 of the multi-ply airbag cushion 200 are matched up. In addition, the first through holes 111 of the first fastener 110 and the second through holes 121 of the second fastener 120 are matched to the first gas holes 211 and the second gas holes 212.

After the overlapped portion 210 of the multi-ply airbag cushion 200 is disposed between the first fastener 110 and the second fastener 120, the first fastener 110 is coupled to the second fastener 120 using the locking members 130. Here, the guide unit 400 is inserted into the corresponding first and second gas holes 211 and 212 Subsequently, the first fastener 110 is fastened to the housing 600 by the locking members 130.

The airbag apparatus which is assembled through the above-stated process is mounted to the bumper frame of the vehicle bumper 500 and is thus used as the external airbag.

As described above, the present invention provides an airbag apparatus with an airbag cushion having a multi-ply structure. Therefore, in the case where the airbag apparatus is used, particularly, as an external airbag, even though gas of high pressure is applied to the multi-ply airbag cushion, it can be prevented from being damaged.

In particular, because gas of high pressure is required to absorb the energy of a vehicle collision, the airbag cushion must be strong enough to withstand a high pressure force. To achieve this purpose, as described in the present invention, if the airbag cushion has the multi-ply structure, the airbag cushion can withstand the high pressure despite being flexible and foldable such that it may be easily contained in a cushion housing. As such, the present invention can satisfy both the strength and the flexibility requirements of the airbag cushion.

Furthermore, in the present invention, a first margin of the multi-ply airbag cushion is overlapped with a second margin thereof, and the overlapped portion is fastened to a fastening unit. Hence, the strength of fastening the airbag cushion to the fastening unit can be increased.

For convenience in explanation and accurate definition in the appended claims, the terms "front", "rear", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag apparatus, comprising:
   a fastening unit mounted to a portion of a vehicle;
   a multi-ply airbag cushion fastened to the fastening unit, the multi-ply airbag cushion being formed by overlapping airbag cushion sheets on each other to form a multi-ply structure, and
   an inflator to provide gas to the airbag cushion sheets of the multi-ply airbag cushion,
   wherein the multi-ply airbag cushion has an overlapped portion formed by overlapping a margin of a first side thereof with a margin of a second side thereof,
   wherein the overlapped portion has a first gas hole formed at a predetermined position through the margin of the first side of the multi-ply airbag cushion, and a second gas hole formed through the margin of the second side of the multi-ply airbag cushion at a predetermined position, and
   wherein the inflator supplies the gas to the multi-ply airbag cushion through the first and second gas holes.

2. The airbag apparatus as set forth in claim 1, wherein portion of the vehicle is a bumper or a housing connected to the bumper, the housing retaining the fastening unit and the multi-ply airbag cushion therein.

3. The airbag apparatus as set forth in claim 1, wherein the fastening unit comprises:
- a first fastener mounted to the portion of the vehicle, the first fastener having a first through hole to receive a portion of a guide unit therein, wherein the guide unit is connected to the inflator to receive the gas therethrough; and
- a second fastener fastened to the first fastener, the second fastener having a second through hole to receive the other portion of the guide unit therethrough,
- wherein the overlapped portion is disposed between the first and second fasteners.

4. The airbag apparatus as set forth in claim 3,
- wherein a plurality of first coupling holes is formed through a perimeter of the first fastener, and locking members are inserted into the corresponding first coupling holes to fasten the first fastener to the portion of the vehicle, and
- a plurality of second coupling holes is formed through a perimeter of the second fastener, and locking members are inserted into the corresponding second coupling holes to fasten the second fastener to the first fastener.

5. The airbag apparatus as set forth in claim 3, wherein a first protrusion protrudes from one surface of the first fastener, the first protrusion extending a predetermined length in a longitudinal direction of the first fastener, and second protrusions protrude from the second fastener in a direction opposing a direction in which the first protrusion protrudes, the second protrusions being spaced apart from each other by predetermined intervals.

6. The airbag apparatus as set forth in claim 1, further comprising:
- a guide unit coupled to the fastening unit, the guide unit being disposed through the first and second gas holes of the overlapped portion of the multi-ply airbag cushion.

7. The airbag apparatus as set forth in claim 1, wherein a tether is coupled to an inner surface of the multi-ply airbag cushion by sewing to control a shape of the multi-ply airbag cushion.

8. The airbag apparatus as set forth in claim 7, wherein the tether is coupled to an inner surface of a front portion of the multi-ply airbag cushion and an inner surface of a rear portion of the multi-ply airbag cushion.

9. The airbag apparatus as set forth in claim 1, wherein the multi-ply airbag cushion has a sewn portion formed by sewing the airbag cushion sheets that are overlapped with each other.

10. The airbag apparatus as set forth in claim 1, wherein the portion of the vehicle comprises a bumper mounted to the vehicle, and the multi-ply airbag cushion comprises an external airbag cushion provided in the bumper.

* * * * *